United States Patent [19]

Smith, Jr. et al.

[11] 3,959,175

[45] May 25, 1976

[54] DEFOAMER CONTAINING LIQUID POLYBUTENE

[76] Inventors: Richard L. Smith, Jr., 5703 Westhill Circle, College Park, Ga. 30022; Joseph W. Johns, Jr., 8403 Attleboro Drive, Jonesboro, Ga. 30236

[22] Filed: Sept. 11, 1974

[21] Appl. No.: 505,141

Related U.S. Application Data

[63] Continuation of Ser. No. 294,221, Oct. 2, 1972, abandoned, which is a continuation of Ser. No. 115,099, Feb. 12, 1971, abandoned.

[52] U.S. Cl................................ 252/321; 252/358
[51] Int. Cl.² ......................................... B01D 19/04
[58] Field of Search............................ 252/321, 358

[56] References Cited
UNITED STATES PATENTS

| | | | |
|---|---|---|---|
| 2,328,551 | 9/1943 | Gunderson | 252/358 |
| 2,820,699 | 1/1958 | Morris | 252/358 |
| 3,076,768 | 2/1963 | Boylan | 252/321 |
| 3,697,440 | 10/1972 | Lichtman et al. | 252/321 |
| 3,705,859 | 12/1972 | Boylan | 252/321 |

*Primary Examiner*—Benjamin R. Padgett
*Assistant Examiner*—David Leland
*Attorney, Agent, or Firm*—Newton, Hopkins & Ormsby

[57] ABSTRACT

An organic defoamer comprising a mixture of polybutene plus at least one predominantly hydrophobic material having a relatively high melting point. A defoaming composition comprising a mixture of polybutene, at least one predominantly hydrophobic material having a relatively high melting point, and a normally hydrophilic material whose surface is rendered hydrophobic.

16 Claims, No Drawings

DEFOAMER CONTAINING LIQUID POLYBUTENE

CROSS-REFERENCE TO RELATED APPLICATIONS

This application is a continuation of Ser. No. 294,221, filed Oct. 2, 1972 which was a continuation of Ser. No. 115,099, filed Feb. 12, 1971, both now abandoned.

BACKGROUND OF THE INVENTION

This invention relates to a material for the treatment of liquid systems which have foaming properties and more particularly to an improved defoamer.

Foaming or frothing is frequently encountered at the surface of liquids due to the entrapping of gases, such as air. This foaming especially occurs when the liquid is heated under reduced pressure or when agitated. The textile, paint and paper industries are some of the activities where typical foaming problems are encountered.

Defoamers, which, when added to a foaming liquid, break down or inhibit the formation of bubbles in the foam, are, of course, old in the art. Some of these defoaming compositions are an admixture of components such as organosiloxane polymers, including silicone oil, and/or normally hydrophilic materials which have their surfaces treated hydrophobic, such as silica.

One of the problems with these old compositions is that their effective shelf lives are relatively short, because a "settling out" of the various components, such as the silica, occurs. Before it can be used, the defoamer usually then has to be agitated, as in a mechanical shaker, so that the components can again be in an intimate admixture.

Another problem which effects the effective shelf-life of these silica-based defoamers is their sensitivity to water. Although the normally hydrophilic or water loving silica is treated to be predominantly hydrophobic or water repelling before it is used in a defoaming compositon, nevertheless, some of the silica is still hydrophilic in nature. As a result, when water enters the silica based defoaming composition, the hydrophilic silica is attracted to the hydroxyl groups of the water molecules causing a settling out of the silica from the mixture. The composition has to be agitated to break up the complex formed by the silica and the water.

Pure organic defoamers have been produced in the past, but they have been found to be ineffective in that they require a large amount of the defoaming agent to accomplish the defoaming process.

The silica based defoamers are expensive, because such a large amount of silica or other expensively treated particles are used in the compositions.

SUMMARY OF THE INVENTION

Briefly described, the present invention discloses an organic defoaming agent comprising polybutene as the base intimately mixed with various components, including at least one predominantly hydrophobic material having a relatively high melting point selected from the group consisting of surfactants, fatty amides, fatty amines, fatty acids, fatty alcohols, tri-glycerides, polyolefin resins, polystyrene resin, polyvinyl resins, and silicone oil. Also disclosed is a defoaming composition comprising polybutene as a base and mixed with a normally hydrophilic material rendered hydrophobic selected from the group consisting of silica and alumina. A further defoaming composition which is disclosed is a mixture of polybutene, at least one predominantly hydrophobic material having a relatively high melting point, and a normally hydrophilic material whose surface is rendered hydrophobic. A mineral oil selected from the group consisting of paraffin oil, naphtenic oil, mineral seal oil, kerosene, and similar petroleoum fractions, may be added to these polybutene based defoamers or as an extending agent.

It is, therefore, a primary object of this invention to provide a defoaming agent for reducing or preventing foaming in aqueous systems which is more effective than previous defoamers.

Another object of this invention is to provide a defoaming agent which has good storage capabilities.

A further object of this invention is to provide a defoamer which is not sensitive to water.

A still further object of this invention is to provide a defoaming agent which is comprised of relatively inexpensive materials.

Another object of this invention is to provide a defoamer which can suppress or control foam formation with a small amount of the defoaming compositon.

DESCRIPTION OF THE INVENTION

Generally, the objects of the invention are achieved by preparing a polybutene based defoamer.

The polybutene has the following general chemical composition:

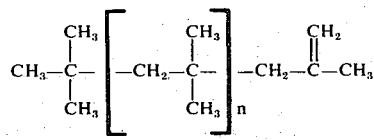

wherein $n$ is a positive integer from 1–50. The Amoco Chemical Corporation and Cosden Oil and Chemical Co. are producers of polybutene under the trade names Indopol and Polyvis. The choice of molecular weight would depend on the different variables present in the system in which the foaming occurs. It has been found that the molecular weight of the polybutene used in the present invention can vary from 200 to 3,000.

A defoamer comprised of 100% polybutene has proven to be a very effective defoaming agent. However, the effectiveness of the polybutene as a defoamer is increased even more if various components are mixed with it.

A large group of these components can be broadly classified as being predominantly hydrophobic materials having a relatively high melting point. Some of these materials are "predominantly" hydrophobic in that while they are water hating, some of their constituent groups attached thereto, such as the —$NH_2$ group, are of a hydrophilic character. All of the materials have a melting point above 40°C., and they all have at least twelve carbons in their chains.

These materials are selected from the group consisting of surfactants, fatty amides, fatty amines, fatty acids, fatty alcohols, tri-glycerides, polyolefin resins, polystyrene resin, polyvinyl resins and silicone oil. All of these materials except the surfactants may comprise from 0.1% to 90% of the defoaming composition by weight. The surfactants can comprise from 0.1 to 5% of the defoamer by weight.

The surfactants are selected from the group consisting of stearamide and polypropylene glycol 425 monooleate; the fatty amides are selected from the group containing stearamide and behenamide; the fatty amines are selected from the group consisting of oleoylamine and stearamine; the fatty acids are selected from the group containing stearic acid and behenic acid; the fatty alcohols are selected from the group containing lauryl alcohol and steryl alcohol; the tri-glycerides are selected from the group containing hydrogenated tallow tri-glyceride and fish tri-glyceride; the polyolefin resins are selected from the group consisting polyethylene resin and polypropylene resin; and the polyviny resin is selected from the group consisting of polyvinyl chloride and polyvinyl acetate.

Another group of additives which can be mixed with polybutene can be classified as normally hydrophilic materials whose surfaces have been treated to be hydrophobic. This material is selected from the group consisting of silica, alumina, talc, finely divided clays, and similar small particles which are normally hydrophilic. These materials can be rendered hydrophobic by any suitable process. The amount of these materials are added to the polybutene is much smaller than the amount of hydrophobic particles in existing defoamers, preferably the amount of these materials should be from about 0.1 to about 2.5% of the composition by weight.

Still a third polybutene-based defoaming composition of the present invention is polybutene, at least one predominantly hydrophobic material having a relatively high melting point, as described above; plus a normally hydrophilic material whose surface area has been rendered hydrophobic, as described above.

Any of these defoaming compositions may be extended by the addition of a mineral oil selected from the group consisting of paraffin oil, napthenic oil, mineral seal oil, kerosene and similar petroleum fractions. These oils comprise anywhere from 0 to 70% of the defoaming compositions by weight.

These defoamers can be easily prepared in either of two ways. They can be produced by simply adding the various constituents together under mechanical agitation, and homogenizing to produce minute particles; or the constituents can be heated together to about 120°C or at least until the high melting material melts, and then allowing the melt to cool down to room temperature whereby the high melting material will precipitate out in small particle size. The particular method of preparation chosen depends upon the properties of the constituents.

The following examples are representative of the various compositions of the polybutene based defoamers. The examples also show the compositions under various test conditions.

The defoamers were tested by first placing 50 ml. of a particular stock obtained from various industries in a 100 ml. graduated cylinder (or 150 ml. of stock in a 250 ml. graduated cylinder). The cylinder is then shaken once with a "shake" consisting of 40 back and forth movements (about 6 inches of travel) in 10 seconds of time. Foam height is measured in ml., the time for the foam to fall is timed in seconds, and the remaining foam is again measured in ml. A drop of the defoamer is then added to the stock. The cylinder is agitated for 5 more "shakes" with the above noted measurements taken after each "shake."

The charts below summarize the test results. The "w/o" means measurements without the defoamer, and the "w" means measurements taken with the defoamer. The chemical names are listed for the particular constituents.

EXAMPLE I

Defoaming composition:
2.7% fatty amide (behenamide)
2.3% hydrophobic silica
0.4% silicone oil (dimethyl polysiloxane)
44.6% mineral oil (100 second oil)
50.0% polybutene (viscosity approximately 500 second)

Stock: 50ml of black liquor from Continental Can Corporation, Hopewell, Va. which was heated to 210°F.

|  |  | 0 | | 1 | | 2 | | 3 | | 4 | | 5 | |
|---|---|---|---|---|---|---|---|---|---|---|---|---|---|
|  |  | w/o | | w/o | w | w/o | w | w/o | w | w/o | w | w/o | w |
| ml. | MAXIMUM FOAM | 70+ | 70+ | 70+ | 17 | 70+ | 17 | 70+ | 18 | 70+ | 19 | | |
| sec. | FOAM KILLING TIME | 15 | 15 | 10 | 10 | 10 | 10 | 10 | 10 | 10 | 10 | | |
| ml. | RESIDUAL FOAM | 70 | 70 | 70 | ¼ | 70 | ¼ | 70 | ½ | 70 | 1 | | |

EXAMPLE II

Defoaming composition:
2.0% fatty amide (behenamide)
1.7% hydrophobic silica
0.3% silicone oil (dimethyl polysiloxane)
96.0% polybutene (viscosity approximately 500 second)

Stock: 50ml. of black liquor from a pulp and paper mill was heated to 210°F.

|  |  | 0 | | 1 | | 2 | | 3 | | 4 | | 5 | |
|---|---|---|---|---|---|---|---|---|---|---|---|---|---|
|  |  | w/o | | w/o | w | w/o | w | w/o | w | w/o | w | w/o | w |
| ml. | MAXIMUM FOAM | 50+ | 50+ | 50+ | 16 | 50+ | 17 | 50+ | 19 | 50+ | 28 | 50+ | 30 |
| sec. | FOAM KILLING TIME | 15 | 15 | 5 | 5 | 5 | 5 | 10 | 10 | 20 | 20 | 30 | 30 |
| ml. | RESIDUAL FOAM | 50 | 50 | 50+ | 0.1 | 50+ | 0.2 | 50+ | 0.2 | 50+ | 4 | 50+ | 3 |

EXAMPLE III

Defoaming composition:
3.0% fatty amine (oleoylamine)
6.0% polyethylene resin
91.0% polybutene (500 second viscosity)
Stock: 50ml. of black liquor from a pulp and paper mill which was heated to 210°F.

|     |                | 0 w/o | 0 w/o | 1 w/o | 1 w | 2 w/o | 2 w | 3 w/o | 3 w | 4 w/o | 4 w | 5 w/o | 5 w |
|-----|----------------|-------|-------|-------|-----|-------|-----|-------|-----|-------|-----|-------|-----|
| ml. | MAXIMUM FOAM   | 150+  | 150+  | 150+  | 40  | 150+  | 50  | 150+  | 55  | 150+  | 60  | 150+  | 70  |
| sec.| FOAM KILLING TIME | 15 | 15    | 7     | 7   | 10    | 10  | 10    | 10  | 15    | 15  | 20    | 20  |
| ml. | RESIDUAL FOAM  | 150   | 150   | 150   | 2   | 150   | 4   | 150   | 6   | 150   | 6   | 150   | 6   |

EXAMPLE IV

Defoaming composition:
2.5% hydrophobic alumina
0.4% silicone oil
0.1% dimethyl disoya ammonium chloride
97.0% polybutene (100 second viscosity)
Stock: 50ml. of black liquor from a pulp and paper mill.

|     |                | 0 w/o | 0 wo | 1 w/o | 1 w | 2 w/o | 2 w | 3 w/o | 3 w | 4 w/o | 4 w | 5 w/o | 5 w |
|-----|----------------|-------|------|-------|-----|-------|-----|-------|-----|-------|-----|-------|-----|
| ml. | MAXIMUM FOAM   | 45    | 45   | 50+   | 21  | 50+   | 20  | 50+   | 20  | 50+   | 21  | 50+   | 20  |
| sec.| FOAM KILLING TIME | 15 | 15   | 15    | 15  | 15    | 15  | 15    | 15  | 15    | 15  | 15    | 15  |
| ml. | RESIDUAL FOAM  | 43    | 43   | 50    | 18  | 15    | 10  | 50    | 7   | 50    | 9   | 50    | 10  |

EXAMPLE V

Defoaming composition:
3.6% n-cetyl acetamide
3.6% fatty amide (behenamide)
3.6% hexydecyl alcohol
44.2% mineral oil (100 second oil - napthenic oil)
45.0% polybutene (500 second viscosity)
Stock: 150ml. of black liquor from a pulp and paper mill.

EXAMPLE VI

Defoaming composition:
20.0% hexadecyl alcohol
30.0% polybutene (500 second viscosity) J
50.0% kerosene
Stock: 50ml. of black liquor from a pulp and paper mill which was heated to 210°F.

|     |                | 0 w/o | 0 w/o | 1 w/o | 1 w | 2 w/o | 2 w | 3 w/o | 3 w | 4 w/o | 4 w | 5 w/o | 5 w |
|-----|----------------|-------|-------|-------|-----|-------|-----|-------|-----|-------|-----|-------|-----|
| ml. | MAXIMUM FOAM   | 70+   | 70+   | 70+   | 25  | 70+   | 30  | 70+   | 30  | 70+   | 35  | 70+   | 38  |
| sec.| FOAM KILLING TIME | 15 | 15    | 15    | 15  | 15    | 15  | 15    | 15  | 15    | 15  | 15    | 15  |
| ml. | RESIDUAL FOAM  | 70+   | 70+   | 70+   | 25  | 70+   | 25  | 70+   | 30  | 70+   | 35  | 70+   | 35  |

EXAMPLE VII

Defoaming composition:
5.0% hydrogenated fish fatty acid
35.0% polybutene (100 second viscosity)
60.0% mineral seal oil
Stock: 150ml. of screen stock from a pulp and paper mill which was heated to 130°F.

|     |                | 0 w/o | 0 w/o | 1 w/o | 1 w | 2 w/o | 2 w | 3 w/o | 3 w | 4 w/o | 4 w | 5 w/o | 5 w |
|-----|----------------|-------|-------|-------|-----|-------|-----|-------|-----|-------|-----|-------|-----|
| ml. | MAXIMUM FOAM   | 70+   | 70+   | 70+   | 40  | 70+   | 30  | 70+   | 31  | 70+   | 28  | 70+   | 26  |
| sec.| FOAM KILLING TIME | 15 | 15    | 15    | 15  | 15    | 15  | 15    | 15  | 15    | 15  | 15    | 15  |
| ml. | RESIDUAL FOAM  | 70    | 70    | 70+   | 3   | 70+   | 1   | 70+   | ½   | 70+   | ½   | 70+   | ½   |

|     |                | 0 w/o | 1 w/o | w | 2 w/o | w | 3 w/o | w | 4 w/o | w | 5 w/o | w |
|-----|----------------|-------|-------|---|-------|---|-------|---|-------|---|-------|---|
| ml. | MAXIMUM FOAM   | 70    | 70    | 70| 15    | 80| 15    | 80| 18    | 80| 18    | 80 20* |
| sec.| FOAM KILLING TIME | 15 | 15 | 5 | 5 | 5 | 5 | 5 | 5 | 5 | 5 | 5 | 5 |
| ml. | RESIDUAL FOAM  | 50    | 50    | 65| 1     | 70| 1     | 70| 2     | 70| 2     | 75| 3 |

*Note: row reads: 70 70 70 15 80 15 80 18 80 18 80 20

EXAMPLE VIII

Defoaming composition:
 5.0% fatty amide (stearamide)
 95.0% polybutene (500 second viscosity)
Stock: 50ml. of brown stock from a pulp and paper mill which was heated to 210°F.

EXAMPLE X

Defoaming composition:
 2.5% hydrophobic silica
 97.5% polybutene (100 second viscosity)
Stock: 50ml. of a pulp and paper mill black liquor which was heated to 210°F.

|     |                | 0 w/o | 1 w/o | w | 2 w/o | w | 3 w/o | w | 4 w/o | w | 5 w/o | w |
|-----|----------------|-------|-------|---|-------|---|-------|---|-------|---|-------|---|
| ml. | MAXIMUM FOAM   | 45    | 45    | 45| 15    | 50| 12    | 48| 14    | 46| 17    | 47| 18 |
| sec.| FOAM KILLING TIME | 15 | 15 | 15 | 15 | 15 | 15 | 45 | 15 | 15 | 15 | 15 | 15 |
| ml. | RESIDUAL FOAM  | 45    | 45    | 45| 5     | 50| 3     | 45| 4     | 44| 5     | 46| 5 |

|     |                | 0 w/o | 1 w/o | w | 2 w/o | w | 3 w/o | w | 4 w/o | w | 5 w/o | w |
|-----|----------------|-------|-------|---|-------|---|-------|---|-------|---|-------|---|
| ml. | MAXIMUM FOAM   | 35    | 35    | 40| 19    | 35| 15    | 40| 15    | 40| 15    | 40| 15 |
| sec.| FOAM KILLING TIME | 15 | 15 | 15 | 15 | 15 | 15 | 15 | 15 | 15 | 15 | 15 | 15 |
| ml. | RESIDUAL FOAM  | 35    | 35    | 35| ½     | 34| 1     | 40| 5     | 40| 15    | 40| 15 |

EXAMPLE IX

Defoaming composition:
 10.0% fatty alcohol (from an alcohol fraction containing from 16–20 carbon atoms)
 5.0% polyethylene resin
 35.0% Kerosene
 50.0% polybutene (500 second viscosity)
Stock: 50ml. of hardwood black liquor off of a digester from a pulp and paper mill which was heated to 210°F.

EXAMPLE XI

Defoaming composition:
 4.5% n-cetyl acetamide
 0.5% silicone oil
 2.0 bis-oleoylamide
 43.0% mineral oil (100 second viscosity - paraffinic oil)
 50.0% polybutene (500 second viscosity)
Stock: 50ml. of pine stock from a pulp and paper mill which was heated to 210°F.

|     |                | 0 w/o | 1 w/o | w | 2 w/o | w | 3 w/o | w | 4 w/o | w | 5 w/o | w |
|-----|----------------|-------|-------|---|-------|---|-------|---|-------|---|-------|---|
| ml. | MAXIMUM FOAM   | 40    | 40    | 40| 10    | 45| 8     | 48| 8     | 48| 8     | 48| 8 |
| sec.| FOAM KILLING TIME | 15 | 15 | 15 | 15 | 15 | 15 | 15 | 15 | 15 | 15 | 15 | 15 |
| ml. | RESIDUAL FOAM  | 40    | 40    | 40| 8     | 45| 5     | 48| 8     | 48| 8     | 48| 8 |

|     |              | 0 w/o | 1 w/o | w | 2 w/o | w | 3 w/o | w | 4 w/o | w | 5 w/o | w |
|-----|--------------|-------|-------|---|-------|---|-------|---|-------|---|-------|---|
| ml. | MAXIMUM FOAM | 45    | 45    | 50| 10    | 50+| 11   | 50+| 15   | 50+| 20   | 50+| 23 |

-continued

|  |  | 0 w/o | 1 w/o | 1 w | 2 w/o | 2 w | 3 w/o | 3 w | 4 w/o | 4 w | 5 w/o | 5 w |
|---|---|---|---|---|---|---|---|---|---|---|---|---|
| sec. | FOAM KILLING TIME | 15 | 15 | 10 | 10 | 10 | 10 | 15 | 15 | 15 | 15 | 15 |
| ml. | RESIDUAL FOAM | 45 | 45 | 50 | ½ | 50+ | ½ | 50+ | 2 | 50+ | 6 | 50+ | 8 |

EXAMPLE XII

Defoaming composition:
5.0% stearamide
0.5% silicone oil
0.5% polypropylene glycol 425 monooleate
44.0% polybutene
50.0% mineral oil Stock: 50ml. of washer filtrate (pine black liquor) from a pulp and paper mill

|  |  | 0 w/o | 1 w/o | 1 w | 2 w/o | 2 w | 3 w/o | 3 w | 4 w/o | 4 w | 5 w/o | 5 w |
|---|---|---|---|---|---|---|---|---|---|---|---|---|
| ml. | MAXIMUM FOAM | 50+ | 50+ | 70+ | 20 | 70+ | 18 | 70+ | 20 | 70+ | 22 | 70 | 20 |
| sec. | FOAM KILLING TIME | 30 | 30 | 15 | 15 | 15 | 15 | 15 | 15 | 15 | 15 | 15 | 15 |
| ml. | RESIDUAL FOAM | 50+ | 50+ | 70 | 15 | 70 | 8 | 70 | 8 | 70 | 8 | 70 | 12 |

EXAMPLE XIII

Defoaming composition:
10.0% fatty alcohol (from an alcohol fraction containing from 16–20 atoms)
20.0% hexadecyl alcohol
10.0% pelargonic acid
60.0% polybutene (approximately — 100 second viscosity)

Stock: 50ml. of hardwood black liquor from a pulp and paper mill which was heated to 210°F.

|  |  | 0 w/o | 1 w/o | 1 w | 2 w/o | 2 w | 3 w/o | 3 w | 4 w/o | 4 w | 5 w/o | 5 w |
|---|---|---|---|---|---|---|---|---|---|---|---|---|
| ml. | MAXIMUM FOAM | 40 | 40 | 40 | 5 | 43 | 5 | 45 | 5 | 46 | 5 | 44 | 5 |
| sec. | FOAM KILLING TIME | 15 | 15 | 2 | 2 | 3 | 3 | 3 | 3 | 3 | 3 | 3 | 3 |
| ml. | RESIDUAL FOAM | 40 | 40 | 40 | ½ | 43 | ½ | 45 | ½ | 46 | ½ | 44 | ½ |

As seen from the above tests, the defoaming compositions of the present invention are very effective in reducing foaming in various aqueous systems. As opposed to silica-based defoamers, silica is used in the defoamers of this invention in such small amounts that the compositions are very economical. Also, the defoamers are less sensitive to water than previous defoamers because of the small amount of silica present.

What is claimed is:

1. A method of defoaming an aqueous system which comprises adding polybutene having a molecular weight of 200–3000 to said system.

2. A method of defoaming an aqueous system which comprises adding to said system a defoaming composition comprising at least ten percent by weight of polybutene having a molecular weight of 200–3000 plus a hydrophobic material having a melting point greater than 40° C.

3. A method as in claim 2 in which said hydrophobic material is selected from the group consisting of surfactants, fatty amids, fatty amines, fatty acids, fatty alcohols, tri-glycerides, polyolefin resins, polystyrene resin, polyvinyl resins and silicone oil.

4. A method as in claim 3 in which said hydrophobic material is a surfactant selected from the group consisting of stearamide and polypropylene glycol 425 monooleate in an amount ranging from 0.5 to 5 percent of said composition by weight.

5. A method as in claim 3 in which said hydrophobic material is a fatty amide selected from the group consisting of stearmide and behenamide in an amount ranging from 0.5 to 90 percent of said composition by weight.

6. A method as in claim 3 in which said hydrophobic material is a fatty alcohol selected from the group consisting of lauryl alcohol and steryl alcohol in an amount from 0.5 to 90 percent of said composition by weight.

7. A method as in claim 3 in which said hydrophobic material is a tri-glyceride selected from the group consisting of hydrogenated tallow tri-glyceride and fish tri-glyceride in an amount ranging from 0.5 to 90 percent by weight of said composition.

8. A method as in claim 3 in which said hydrophobic material is a polyolefin resin selected from the group consisting of polyethylene resin and polypropylene resin in an amount ranging from 0.5 to 90 percent of said composition by weight.

9. A method as in claim 3 in which said hydrophobic material is a polyvinyl resin selected from the group consisting of polyvinyl chloride and polyvinyl acetate in an amount ranging from 0.5 to 90 percent by weight of said composition.

10. A method as in claim 2 wherein said defoaming composition further includes a petroleum oil selected from the group consisting of paraffin oil, napthenic oil, mineral seal oil and kerosene.

11. A method of defoaming an aqueous system which comprises adding to said system a defoaming composition comprising at least thirty percent by weight of polybutene having a molecular weight of 200 – 5,000 and a normally hydrophylic material whose surface has been treated to be hydrophobic.

12. A method as in claim 11 wherein said normally hydrophylic material whose surface has been treated to be hydrophobic is selected from the group consisting of silica, alumina, talc and finely divided clays, said material comprising from 1.1 to 2.5 percent of said composition by weight.

13. A method as in claim 12 wherein said material comprises from 1.1 to 2.5 percent of said composition by weight.

14. A method as in claim 12 wherein said defoaming composition further includes a petroleum oil selected from the group consisting of paraffin oil, napthenic oil, mineral seal oil and kerosene.

15. A method of defoaming an aqueous system which comprises adding to said system a defoaming composition comprising polybutene in an amount ranging from 50 to 99 percent of said composition by weight, a hydrophobic material having a melting point greater than 40°C in an amount ranging from 0.1 to 90 percent of said composition by weight and a normally hydrophylic material whose surface has been treated to be hydrophobic in an amount ranging from 0.1 to 2.5 percent of said composition by weight.

16. A method as in claim 15 wherein said defoaming composition further includes a petroleum oil selected from the group consisting of paraffin oil, napthenic oil, mineral seal oil and kerosene; and wherein said petroleum oil comprises from 0 to 70 percent of said composition by weight.

* * * * *